Oct. 24, 1933.        J. C. PETERSON        1,931,705
VARIABLE STROKE ENGINE
Filed May 6, 1930          3 Sheets-Sheet 2
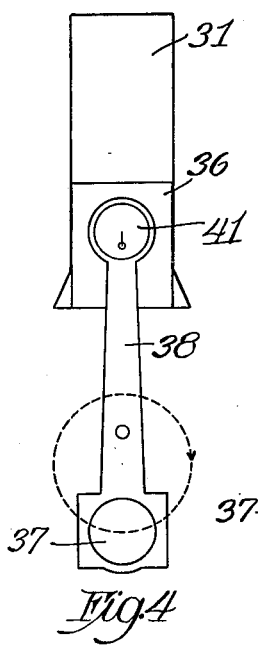
Fig.4
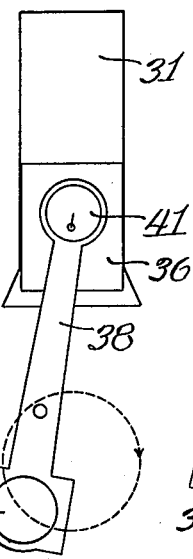
Fig.5
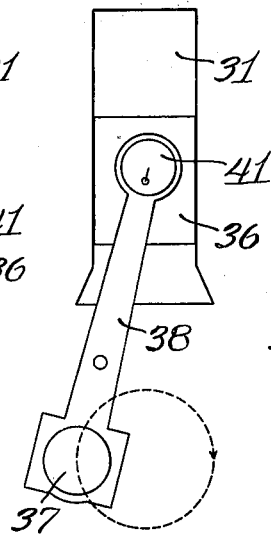
Fig.6
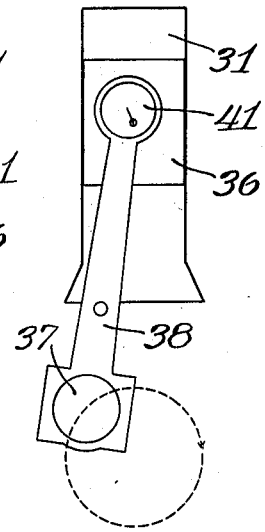
Fig.7
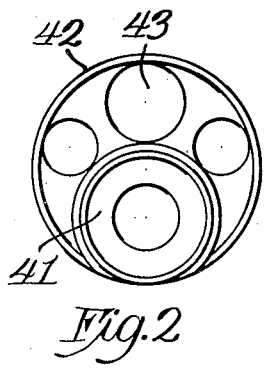
Fig.2
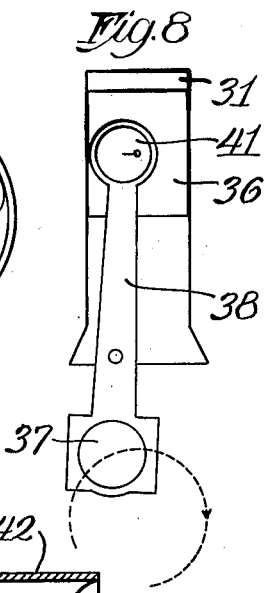
Fig.8
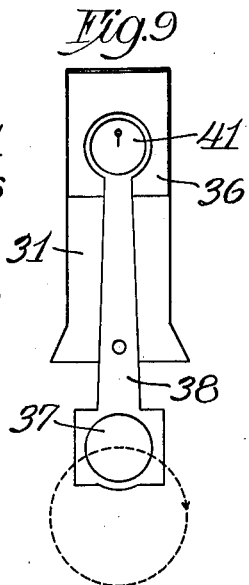
Fig.9
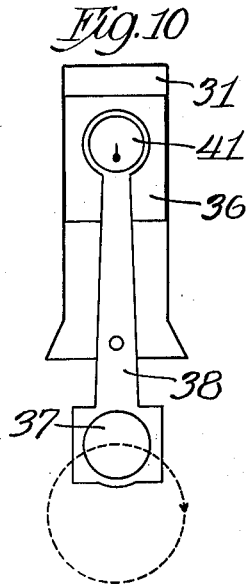
Fig.10
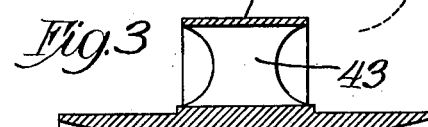
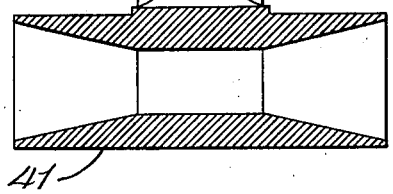
Fig.3
Inventor
Julius C. Peterson
By Gibson, Mann & Gettys
Attys.

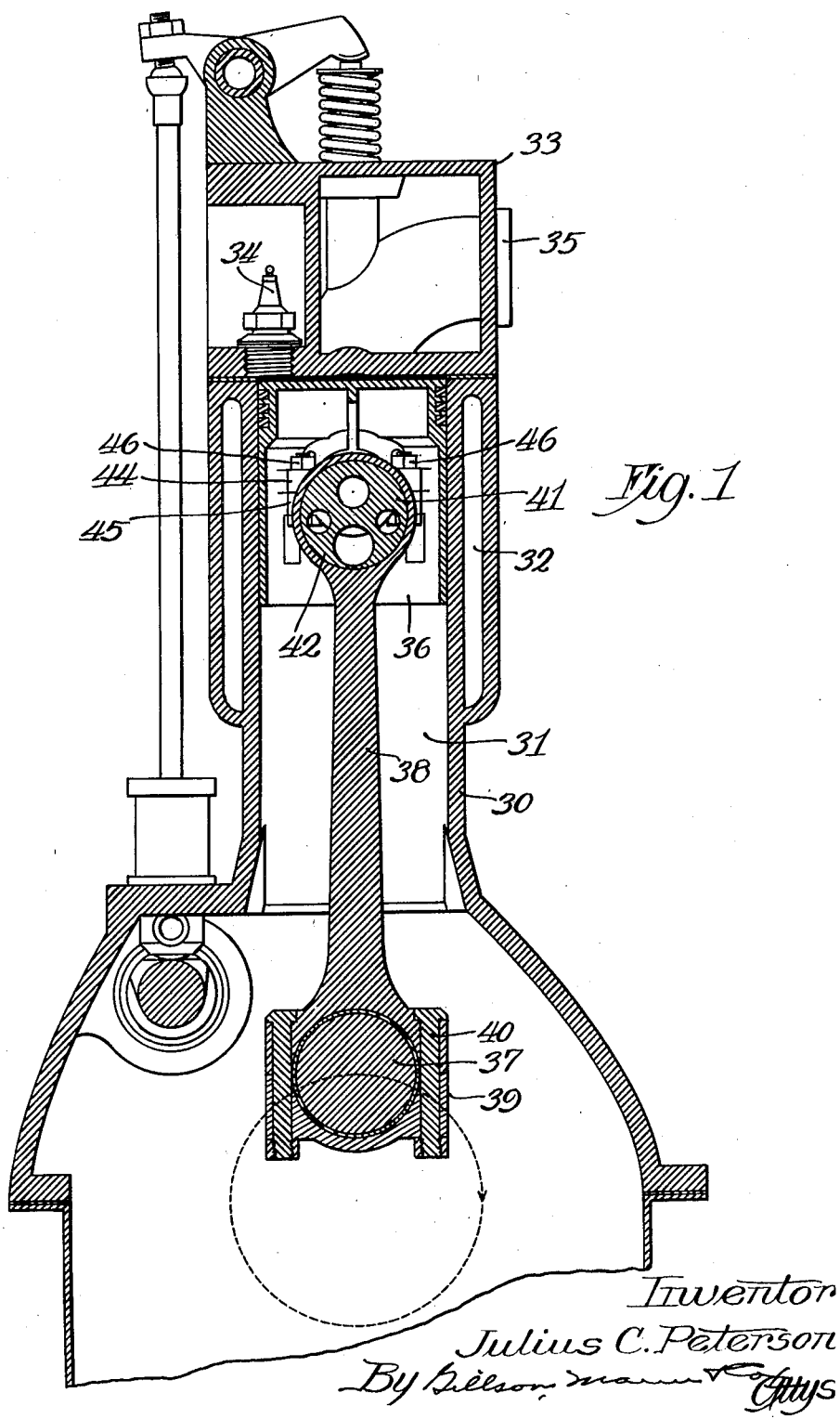

Oct. 24, 1933.  J. C. PETERSON  1,931,705
VARIABLE STROKE ENGINE
Filed May 6, 1930  3 Sheets-Sheet 3
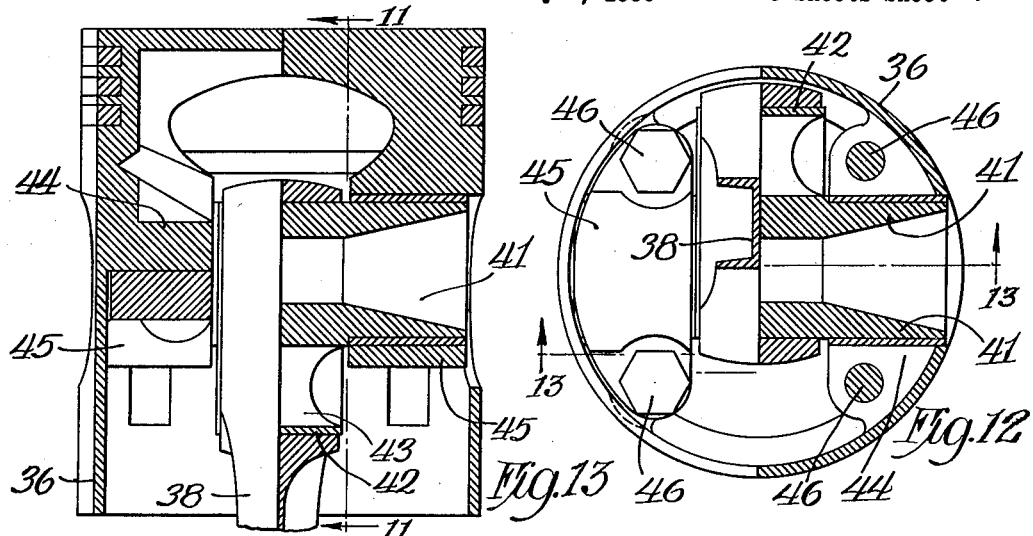
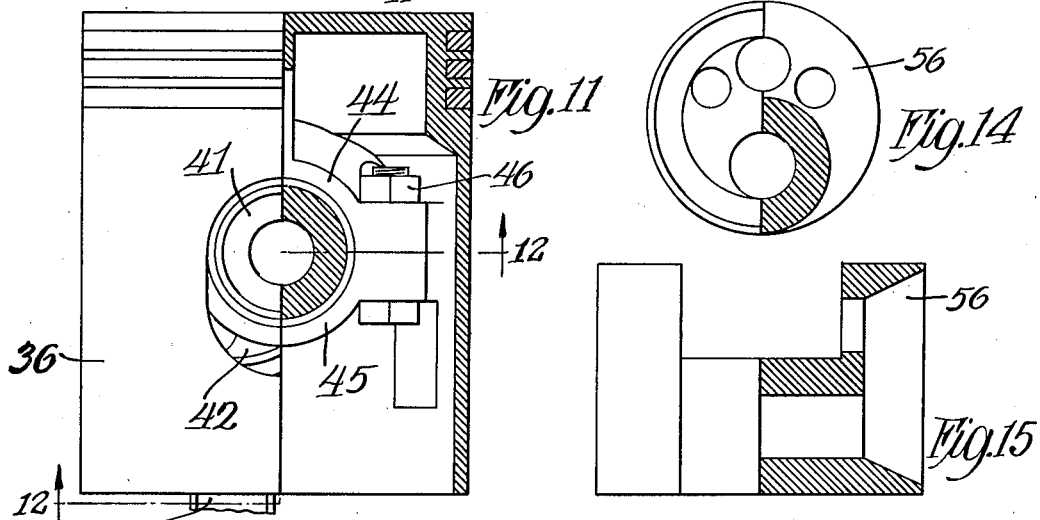
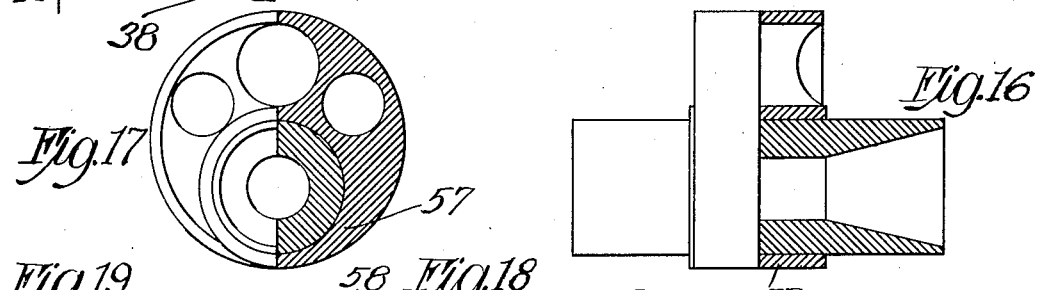
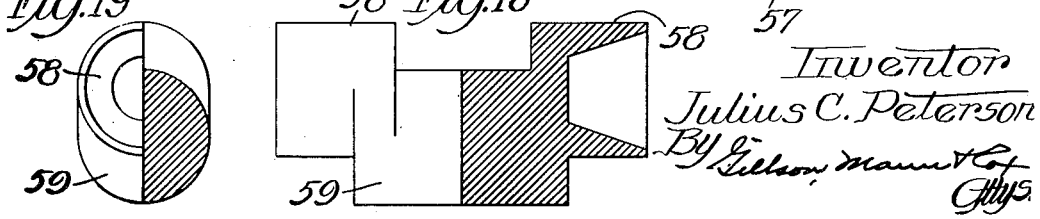
Inventor
Julius C. Peterson Patented Oct. 24, 1933

1,931,705

UNITED STATES PATENT OFFICE 1,931,705

VARIABLE STROKE ENGINE

Julius C. Peterson, Chicago, Ill.

Application May 6, 1930. Serial No. 450,118

2 Claims. (Cl. 123—78)

Many attempts have been made to design a variable stroke internal combustion engine which would meet the requisites of efficiency and manufacturing practicability. Some have resulted in the use of telescoping connecting rods combined with various springs; others in a complexity of levers, but none of these devices is practical.

The principal object of this invention is to provide a simple means for obtaining a variable stroke in an internal combustion engine without necessitating radical changes in the methods of manufacture and without materially increasing the size and weight of the engine.

Further objects and advantages will become apparent as the disclosure proceeds and the description is read in conjunction with the accompanying drawings, in which Fig. 1 is a vertical, transverse, sectional view through an internal combustion engine embodying a preferred form of this invention;

Fig. 2 is an end, elevational view of the eccentric bearing wrist pin;

Fig. 3 is a longitudinal section through the same;

Figs. 4 to 9 inclusive are diagrammatic views representing successive positions of the mechanism during the exhaust stroke;

Fig. 10 is a diagrammatic view showing the relative position of the moving parts at the end of the compression stroke and the beginning of the power stroke;

Fig. 11 is a view partly in section and partly in elevation illustrating the construction of the piston in the preferred form, the section being taken on the line 11—11 of Fig. 13;

Fig. 12 is a sectional view of the piston taken on the line 12—12 of Fig. 11 and showing the bearing caps for the wrist pin;

Fig. 13 is a vertical, sectional view of the same, taken on the line 13—13 of Fig. 12;

Figs. 14 and 15, 16 and 17, 18 and 19 are views partly in section and partly in elevation, showing respectively other forms of eccentrics which could be used in place of the eccentric bearing wrist pin shown in Figs. 2 and 3.

But this specific illustration and the corresponding specific description are for the purpose of disclosure only for it is realized that the invention may be embodied in a variety of forms and, therefore, reference should be had to the appended claims in determining the scope of the invention.

In the conventional engine in which the piston stroke is kept constant, much power is lost because of the fact that it is impossible to completely scavenge the cylinder of the products of combustion with the result that these residual burned gases will mix with the incoming fuel on the intake stroke and produce a fuel mixture less combustible than if the residual gases were not present.

Another disadvantage in a constant stroke engine is that fuel cannot be drawn into the cylinder on the intake stroke until the downward movement of the piston has reduced the pressure within the cylinder to below atmospheric pressure, and consequently a smaller quantity of fuel will be drawn into the cylinder. This quantity is further reduced by the expansion of the incoming fuel caused by the heat of the exhaust gases.

The variable stroke engine seeks to overcome these disadvantages by causing the piston to travel the full length of the cylinder on the exhaust and intake strokes, thus completely scavenging the cylinder of the products of combustion and causing the fuel mixture to be drawn into the cylinder immediately upon the downward movement of the piston on its intake stroke. On the compression stroke, the piston moves to a point somewhat short of the top of the cylinder forming a combustion chamber in which the fuel mixture is compressed and then ignited by suitable ignition means.

It has been found that for an engine having a six to one compression ratio, a variable stroke engine can develop 26.5% more power than one employing a constant stroke, and at the same time reducing the fuel consumption about 22% per unit of power. For an engine having a compression ratio of four to one, the increase in power is approximately 45% while the decrease in fuel consumption is about 34% per unit of power.

The greater efficiency of the variable stroke engine may be explained by the fact that the replacement of the exhaust gases which remain in the constant stroke engine at the beginning of the intake stroke by an equal amount of air would give a more inflammable mixture while a mixture equally inflammable to that containing the residual exhaust gases would be obtained by mixing the air with an appreciably smaller quantity of fuel. Furthermore, the amount of fuel contained in the mixture, when the residual burned gas is absent, necessary to render the mixture inflammable, will be less than the amount of fuel required when the residual burned gas is present.

Referring now to the drawings in which the invention is shown as applied to an overhead valve motor, the reference character 30 designates an engine block having a plurality of straight, cylindrical bores 31 surrounded by a water jacket 32. A head 33, substantially flat on its lower side, closes the cylinder bores and is provided with the usual spark plugs 34, intake and exhaust passages 35 and valves, not shown.

Inasmuch as this part of the engine is of the usual construction, a detailed description of these parts is deemed unnecessary, the only requirements being that the piston be free to travel the full length of the cylinder without obstruction, and that the compression space lie within the cylinder walls so that the cylinder can be completely scavenged upon the exhaust stroke. Of course, other constructions could be employed which would attain the desired results to a somewhat less degree, as for example by having a part of the compression space in the head, but for the maximum efficiency, the preferred construction should be used.

The piston 36 is adapted to reciprocate within the cylinder and transmits the force applied to its face to the crank shaft 37 by a connecting rod 38. The lower end of the connecting rod is mounted on the crank pin bearing in the usual manner by a bearing cap 39 held in place by bolts 40.

Ordinarily, the upper end of the connecting rod is pivoted on a wrist pin which extends transversely between the sides of the piston. In this instance, the usual wrist pin is replaced by a combined pin and eccentric bearing 41 shown most clearly in Figs. 2 and 3. This eccentric bearing wrist pin differs only from the usual pin in that it is provided with an integral eccentric bearing 42 midway its length, which is made as light as possible by providing the holes 43 and grooving the faces of the web. It will be understood that the wrist pin 41 is free to rotate within its bearings and that the eccentric is of such size that the wrist pin can make a complete revolution when the connecting rod is in place.

The eccentric bearing 42 on the wrist pin prevents the pin from being inserted in the usual manner, that is through the side of the piston, so it is necessary to cut away the lower half of the wrist pin bosses 44, insert the pin from the bottom, and hold the pin in place by bearing caps 45 secured to the upper parts of the bosses by bolts 46. Since the pin in this instance is made of maximum length, the side walls of the piston must be cut away slightly to permit the pin to be inserted.

The upper end of the connecting rod is adapted to fit over the eccentric bearing 42, and since these two parts may be assembled before the wrist pin is put in place, it is not necessary to provide bearing caps for this end of the connecting rod.

The operation of an engine in which my invention is incorporated is exactly the same as a similar engine without it, except for the movement of the piston, piston pin and eccentric, and connecting rod. Advantage is taken of the inertia and momentum of these parts to cause them to operate in the manner to be explained. Assuming that the engine is running, Fig. 4 shows the various parts in the positions they take at the end of the power stroke and the beginning of the exhaust stroke. The motion of the crank pin in its circular path is clockwise, as indicated by the arrowhead on the circle. The crank pin is at the bottom of its circle and the piston is in the lowest position, the eccentric being up. The exhaust valve is already slightly open. While the valves are not shown in the figure, it is assumed that they are functioning as usual.

The inertia of the piston is overcome by the thrust of the connecting rod upward and after one quarter of the exhaust stroke, the parts assume the positions shown in Fig. 5. The piston is being accelerated upward, the reaction downward keeping the eccentric upward with its center on the axis of the connecting rod. As the exhaust stroke is half completed, the same conditions prevail and the parts have the approximate positions shown in Fig. 6.

After passing the halfway point and before reaching the three quarter point, the piston attains its highest velocity. The crank pin and the lower end of the connecting rod maintain a constant velocity in the crank pin circle, the horizontal component of this velocity being constantly increasing and the vertical component being constantly decreasing. The upper end of the connecting rod, being no longer restrained by the eccentric, since the piston is now moving upward by its own momentum, moves to the left as the connecting rod rotates slightly about its center of gravity, the lower end being carried to the right by the crank pin.

At the three quarter point, then, the various members of the system will approximately occupy the positions shown in Fig. 7.

At about the seven eighths point, the top of the connecting rod will have continued its movement to the left as far as the eccentric will permit, the eccentric being then to the left. The piston, somewhat retarded by the friction between it and the cylinder walls and by the pressure of the burned gas which it is forcing out of the cylinder, still has considerable momentum left. Fig. 8 shows the approximate positions of the parts at this time.

Between the seven-eighths point and the end of the stroke, the horizontal acceleration of the crank pin and the lower end of the connecting rod is very slight, hence the tendency for the connecting rod to rotate about its center of gravity is almost entirely due to its rotational momentum. On the other hand, the position of the eccentric is most favorable to permit the piston to continue its upward movement. Consequently, the momentum of the piston carries it upward and through the action of the eccentric pulls the top of the connecting rod to the right. The work thus done uses up the momentum of the piston and it comes gently to the position shown in Fig. 9. Should the momentum of the piston be insufficient to perform this last operation, due to the engine being run at a very low speed, the piston will still get very nearly to the position shown, since the tendency of the top of the connecting rod is to move to the right almost as soon as the crank pin crosses the top of its circle. In any event, the worst that can happen, at low speed, is that the expulsion of the exhaust gas will be slightly less complete than at higher speed.

On the intake stroke, the action is quite similar to that on the exhaust stroke. The intake valve is open and the piston is pulled downward from the position shown in Fig. 9, until it attains its maximum velocity. Thereafter it is carried downward by its own momentum, the upper end of the connecting rod is thrown to the right and then brought back to the left by the momentum of the piston acting through the eccentric, and the parts take the positions shown in Fig. 4.

On the compression stroke, the action of the eccentric and the piston will be similar to that described with reference to the exhaust stroke, except that the forces which are acting to lengthen the piston stroke will be opposed by the pressure which is being developed in the combustion chamber. The effect, then, is to hold the piston in its lowermost position in relation to the connecting rod, or at least substantially so, since the pressure in the cylinder is approximately 100 lbs. to the square inch at the end of the stroke, in an engine having a compression ratio as low as five to one. At the end of the compression stroke, therefore, the parts will assume the relative positions shown in Fig. 10 in which the connecting rod will have its shortest effective length.

On the power stroke, the compression on the cylinder head will overcome any forces acting to cause the eccentric to change its position from that assumed at the end of the compression stroke, with the result that at the end of the power stroke, the parts will be in the relationship shown in Fig. 4.

In other words, what happens is that the piston is given a short or long stroke depending upon the forces acting to rotate the eccentric. At some engine speeds, it is possible that the eccentric would function otherwise than in the precise manner which has been described, but in all events whether the eccentric is caused to rotate clockwise or counterclockwise, the desired results will be accomplished, since there is a constant tendency for the parts which are in unstable equilibrium to find stable equilibrium.

It is understood that the invention is not confined to the particular form of eccentrics which have been described, for the advantages of this invention could be equally well obtained by providing various other forms. For example in Figs. 14 and 15, there is shown a wrist pin in the form of a single throw crank shaft, the arms 56 being adapted to be journaled in enlarged bosses in the piston. It will be seen that in this form of eccentric, it would not be necessary to provide bearing caps for the wrist pin since the entire eccentric could be inserted through suitable apertures in the piston.

In Figs. 16 and 17, a wrist pin is shown which is quite similar to the one used in the preferred form except that the eccentric instead of being integral with the pin is separate from it. This construction, however, has the disadvantage that the upper connecting rod bearing must be made somewhat larger in order to be able to have a sufficient thickness at the thin portion 57 of the eccentric bearing.

Still another form of eccentric is shown in Figs. 18 and 19 which is similar to the one in Figs. 14 and 15, the difference being that the shaft arms 58 are not as large and that the eccentric portion 59 extends beyond their bearing surfaces, thereby necessitating bearing caps both on the wrist pin and on the upper end of the connecting rod.

What I claim is:

1. In an internal combustion engine of the type in which the exhaust and intake strokes are of greater length than the compression and power strokes, an engine block having a cylindrical bore, a piston within the bore, a crank shaft, a connecting rod between the piston and crank shaft, and a freely floating eccentric bearing between the piston and the upper end of the connecting rod.

2. In an internal combustion engine of the type in which the exhaust and intake strokes are of greater length than the compression and power strokes, an engine block having a cylindrical bore, a piston within the bore, a crank shaft, a connecting rod between the piston and crank shaft, and a freely floating eccentric bearing between the piston and the upper end of the connecting rod, said bearing having apertures to reduce weight.

JULIUS C. PETERSON.